United States Patent
Wang

(10) Patent No.: US 11,764,771 B2
(45) Date of Patent: Sep. 19, 2023

(54) EVENT DETECTION CONTROL DEVICE AND METHOD FOR CIRCUIT SYSTEM CONTROLLED BY PULSE WAVE MODULATION SIGNAL

(71) Applicant: NUVOTON TECHNOLOGY CORPORATION, Hsinchu (TW)

(72) Inventor: Cheng-Chieh Wang, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 17/970,165

(22) Filed: Oct. 20, 2022

(65) Prior Publication Data

US 2023/0216488 A1 Jul. 6, 2023

(30) Foreign Application Priority Data

Dec. 30, 2021 (TW) ................................. 110149639

(51) Int. Cl.
| | |
|---|---|
| *H03K 3/00* | (2006.01) |
| *H03K 5/153* | (2006.01) |
| *H03K 3/017* | (2006.01) |
| *H03K 5/1252* | (2006.01) |
| *H03K 3/011* | (2006.01) |
| *H03K 3/013* | (2006.01) |
| *H03K 5/04* | (2006.01) |
| *G06F 21/75* | (2013.01) |

(52) U.S. Cl.
CPC ............. *H03K 5/153* (2013.01); *H03K 3/011* (2013.01); *H03K 3/013* (2013.01); *H03K 3/017* (2013.01); *H03K 5/04* (2013.01); *H03K 5/1252* (2013.01); *G06F 21/755* (2017.08)

(58) Field of Classification Search
CPC ...... H03K 3/013; H03K 3/011; H03K 5/1252; H03K 5/04; H03K 3/017; H03K 5/153; G06F 21/755
See application file for complete search history.

(56) References Cited

U.S. PATENT DOCUMENTS

| | | | |
|---|---|---|---|
| 2014/0333361 A1* | 11/2014 | Chau | H03K 3/017 327/175 |
| 2020/0321947 A1* | 10/2020 | Tsuruyama | H02M 3/156 |
| 2021/0336608 A1* | 10/2021 | Akondy Raja Raghupathi | G06F 1/08 |

\* cited by examiner

*Primary Examiner* — Tuan T Lam
(74) *Attorney, Agent, or Firm* — Muncy, Geissler, Olds & Lowe, P.C.

(57) ABSTRACT

An event detection controller for a circuit system controlled by a pulse wave modulation signal, can perform a specific event handling when a specific event is detected, wherein the specific event handling includes stopping a pulse wave modulation device, starting up the stopped pulse wave modulation device, controlling the pulse wave modulation device to change the pulse wave modulation signal, outputting a wake-up signal to wake up the circuit system, controlling the pulse detector to change its detection configuration, changing a cumulative occurrences number of the specific pattern of an event discrimination module, outputting a control signal or a first data signal to a peripheral device through a bus connected to an event response module and/or requesting the peripheral device to send a second data signal through the bus.

16 Claims, 3 Drawing Sheets

EVENT DETECTION CONTROL DEVICE AND METHOD FOR CIRCUIT SYSTEM CONTROLLED BY PULSE WAVE MODULATION SIGNAL

CROSS-REFERENCE TO RELATED APPLICATION

This application claims the priority benefit of Taiwan application serial no. 110149639, filed on Dec. 30, 2021, the full disclosure of which is incorporated herein by reference.

BACKGROUND

Technical Field

The present disclosure relates to an event detection control device and method for circuit system controlled by a pulse wave modulation signal, and more particularly to an event detection control device and method which performs the internal and external synchronizing control for safety requirements, perform the internal control for various waveform output, and/or perform the external control to connect with the external peripheral device for the low power consumption requirements of the system, when the specific event is detected.

Description of Related Art

The circuit system in present mostly has a pulse wave modulation device to perform related control, for example, the power control or the logic circuit control. The pulse wave modulation device usually comprises a counter and a comparator, which can determine the waveform of the pulse wave modulation signal via the operation of the counter and the comparator. Generally, hackers may use the temperature attack for example or other ways to influence the waveform of the pulse wave modulation signal, or the change of the operational environment and the ageing of the circuit may also influence the waveform of the pulse wave modulation signal. If there is an error in the pulse wave modulation signal outputted by the pulse wave modulation device, it will cause errors in the operation of the whole circuit system, and the basic safety requirements and the signal reliability cannot be achieved.

SUMMARY

An event detection controller is provided in an embodiment of the present disclosure. The event detection controller is used for a circuit system controlled by a pulse wave modulation signal, including a pulse detector, an event discrimination module, and an event response module. The event discrimination module is electrically connected to the pulse detector, and the event response module is electrically connected to the event discrimination module. The pulse detector is configured to receive a detection configuration which has been set and the pulse wave modulation signal from a pulse wave modulation device to detect whether the pulse wave modulation signal has a specific pattern corresponding to the detection configuration and generate a detection result signal, wherein the specific pattern includes a specific duty cycle, a specific edge and/or a specific level. The event discrimination module is configured to receive the detection result signal and update a cumulative occurrence number of the specific pattern according to the detection result signal, and generate a specific event signal according to the cumulative occurrence number of the specific pattern. The event response module is configured to receive the specific event signal and a specific event pattern corresponding to the detection configuration, and perform a specific event handling which is defined corresponding to the specific event pattern according to the specific event signal, wherein the specific event handling includes stopping the pulse wave modulation device, starting up the stopped pulse wave modulation device, controlling the pulse wave modulation device to change the pulse wave modulation signal, outputting a wake-up signal to wake up the circuit system, controlling the pulse detector to change the detection configuration, changing the cumulative occurrences number of the specific pattern of the event discrimination module, outputting a control signal or a first data signal to a peripheral device through a connected bus to the event response module and/or requesting the peripheral device to send a second data signal through the bus.

A circuit system is further provided in an embodiment of the present disclosure. The circuit system includes the event detection controller, the pulse wave modulation device described above and a load circuit. Additionally, a method used for the event detection controller is further provided in an embodiment of the present disclosure.

In summary, the event detection controller and method provided in an embodiment of the present disclosure can detect the specific event of the circuit system, and if the specific event is detected, at least one of the internal and external synchronizing control for safety requirements, the internal control for various waveform output, and the external control to connect with the external peripheral device for the low power consumption requirements of the system can be performed.

In order to further understand the technology, means, and effects of the present disclosure, reference may be made by the detailed description and drawing as follows. Accordingly, the purposes, features and concepts of the present disclosure can be thoroughly and concretely understood. However, the following detailed description and drawings are only used to reference and illustrate the implementation of the present disclosure, and they are not used to limit the present disclosure.

BRIEF DESCRIPTION OF THE DRAWINGS

The accompanying drawings are provided to enable person having ordinary skill in the art can further understand the present disclosure, and the accompanying drawings are incorporated in and constitute a part of the specification of the present disclosure. The drawings illustrate exemplary embodiments of the present disclosure, and the description in the specification of the present disclosure is served to explain together the principal of the present disclosure.

DETAILED DESCRIPTION

Figure 1:
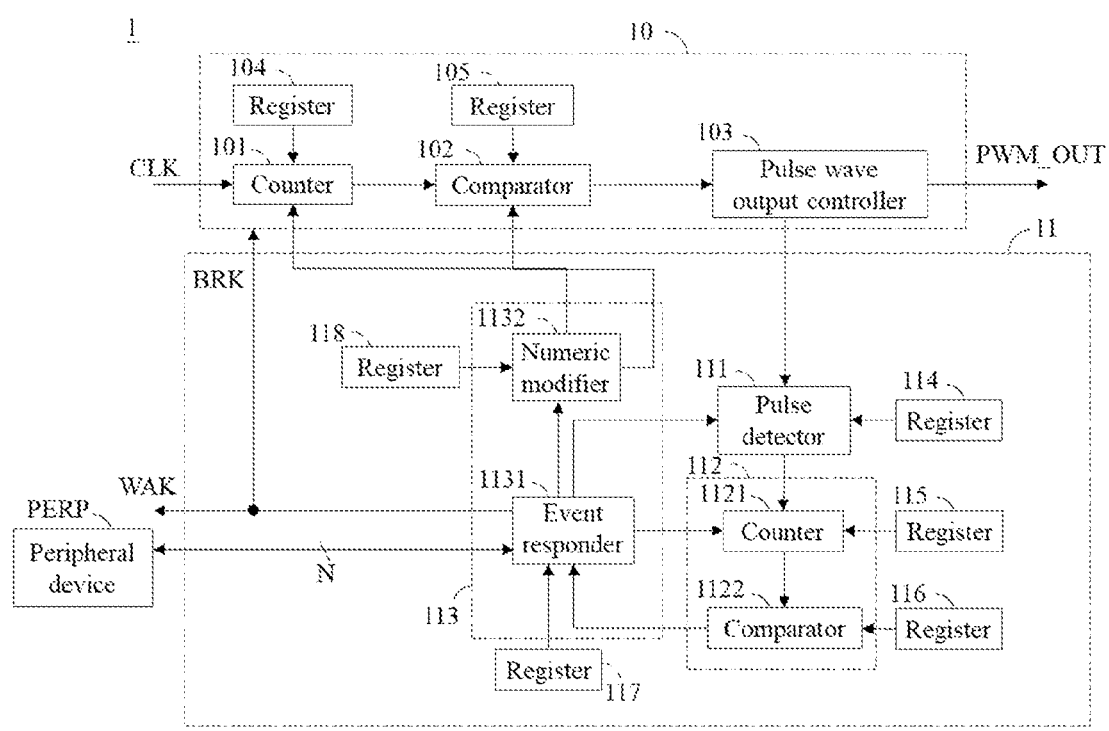
FIG. 1 is a schematic block diagram of an event detection controller for a circuit system controlled by a pulse wave modulation signal according to an embodiment of the present disclosure.

Reference will now be made in detail to exemplary embodiments of the present disclosure, exemplary embodiments of which are illustrated in the accompanying drawings. Wherever possible, the same element number is used in the drawings and the description to refer to the same or the similar part. Furthermore, exemplary embodiments are only one of implemental ways in the concept of design of the present disclosure, none of exemplars described below is intended to limit the present disclosure.

An event detection control device and method for circuit system controlled by pulse wave modulation signal are provided by embodiments of the present disclosure, which can detect the specific event of the circuit system, and when the specific event is detected, the event detection control device and method can perform the internal and external synchronizing control to achieve safety requirements, perform the internal control to achieve various waveform output, and/or perform the external control to connect with the external peripheral device to achieve the low power consumption requirements of the system.

For example, the execution of internal and external synchronizing control for safety requirements is to feedback change the detection configuration and the cumulative occurrence number of the specific pattern for the specific event, and the specific data can be transferred to the external peripheral device when needed. Thus, a plurality of consecutive specific events can be detected, so as to make links among the specific events, and make the peripheral device record the specific data (e.g. modulation parameters, reports, or other parameters of the circuit system) when the pulse wave modulation device is stopped. Thereby, the overall system security system protection can be achieved. For example, when temperature attack occurs (e.g. the heating up attack), the frequency drift problem of the clock signal may appear. For such an attack described above, the internal and external synchronizing control can firstly detect whether the cumulative occurrence number of the specific pattern that the duty cycle of the pulse wave modulation signal is lower than 70% is over two times. If the cumulative occurrence number of the specific pattern that the duty cycle of the pulse wave modulation signal is lower than 70% is over two times, the cumulative occurrence number of the specific pattern can be reset and the detection can be changed to detect whether the cumulative occurrence number of the specific pattern that the duty cycle of the pulse wave modulation signal is lower than 50% is over two times. If the cumulative occurrence number of the specific pattern that the duty cycle of the pulse wave modulation signal is lower than 50% is over two times, the clock signal modulation device will be stopped, so as to avoid the attack described above. At the same time, the reports of the consecutive plurality of specific events can be transferred to the external peripheral device, so that the reports can be used for debug or check later.

Furthermore, for example, the execution of the internal control to achieve various waveform output for the specific event (i.e. the waveform of the pulse wave modulation signal which indicates the internal state event) is to feedback change the modulation manner which the pulse wave modulation device modulates the pulse. When the circuit system is operated in a low power mode (such as standby mode), the event detection controller is still electrically connected to the pulse wave modulation device, and the execution of the internal control is to determine whether to revise the value of the comparator in the pulse wave modulation device and/or the value of the counter in the pulse wave modulation device according to the internal state event, so as to output more various waveforms of the pulse wave modulation signal without the intervention of the processing unit of the circuit system. The execution of the external control is to access and control the peripheral device according to the specific events when the circuit system is operated in the low power mode (i.e. the processing unit is slept and other components is in the low power mode), without awaking the processing unit of the circuit system to intervene the control.

Further details are as shown in FIG. 1, and FIG. 1 is a schematic block diagram of an event detection controller for a circuit system controlled by a pulse wave modulation signal according to an embodiment of the present disclosure. A circuit system 1 comprises a pulse wave modulation device 10, an event detection controller 11 and a load circuit (not shown in FIG. 1), and the pulse wave modulation device 10 is electrically connected to the event detection controller 11 and the load circuit. The load circuit is for example a power management circuit, a digital operation circuit or a control circuit, and is controlled by a pulse wave modulation signal.

The pulse wave modulation device 10 is a pulse width modulation device, and the pulse wave modulation signal is a pulse width modulation signal. The pulse wave modulation device 10 is configured to receive a clock signal CLK, and the pulse wave modulation signal is generated from the clock signal CLK. As described above, the pulse wave modulation signal can be a pulse wave modulation signal during the modulation process, and can also be an output pulse wave modulation signal PWM_OUT transferred to the circuit system 1 at the last. Generally speaking, no matter it is the pulse wave modulation signal during the modulation process or the output pulse wave modulation signal PWM_OUT, the pulse wave modulation signal can influence eventually the control of the circuit system 1. Therefore, the detection of the pulse wave modulation signal can be the detection of the pulse wave modulation signal during the modulation process or the detection of an output pulse wave modulation signal PWM_OUT, and the present disclosure is not limited thereto.

The pulse wave modulation device 10 comprises a counter 101, a comparator 102 and a pulse wave output controller 103. The counter 101 is electrically connected to the comparator 102, the comparator 102 is electrically connected to the pulse wave output controller 103, and the pulse wave output controller 103 is electrically connected to the event detection controller 11 and the load circuit. The counter 101 is configured to receive the clock signal CLK, and update the count value according to the clock signal CLK. The comparator 102 is configured to receive the comparison reference value and the count value of the counter 101, and generate a comparison signal after the comparison. The pulse wave output controller 103 is configured to receive the comparison signal outputted by the comparator 102, and generate the pulse wave modulation signal and the output pulse wave modulation signal PWM_OUT. The pulse wave output controller 103 can be implemented via a plurality of delay circuits and a plurality of logic circuits, but the present disclosure is not limited thereto. The pulse wave modulation device 10 further comprises registers 104, 105. The register 104 and the register 105 are respectively electrically connected to the counter 101 and the comparator 102, and respectively temporary store the initial value of the count value of the counter 101 and the initial value of the comparison reference value received by the comparator 102.

The event detection controller 11 comprises a pulse detector 111, an event discrimination module 112 and an event response module 113. The event discrimination module 112 is electrically connected to the pulse detector 111, and the event response module 113 is electrically connected to the event discrimination module 112. The pulse detector 111 is configured to receive the set detection configuration and the pulse wave modulation signal from the pulse wave output controller 103, for example, the pulse wave modulation signal or the output pulse wave modulation signal PWM_OUT during the modulation process of the pulse wave output controller 103, but not as limitation, so as to detect whether the pulse wave modulation signal has a specific pattern corresponding to the detection configuration, and to generate the detection result signal, wherein the specific pattern comprises a specific duty cycle, a specific edge and/or a specific level. The specific duty cycle is the ratio defined as the value of the consecutive time in the logic high level over the cycle of the pulse wave modulation signal, the specific edge comprises the rising edge or the falling edge, and the specific level comprises the logic high level or logic low level for example.

The event discrimination module 112 is configured to receive the detection result signal, update the cumulative occurrence number of the specific pattern according to the detection result signal, and generate the specific event signal according to the cumulative occurrence number of the specific pattern. The event response module 113 is configured to receive specific event signal and the specific event pattern corresponding to the detection configuration, and according to the specific event signal, perform the specific event handling defined by the corresponding specific event pattern, wherein the specific event handling comprises stopping the pulse wave modulation device 10 (via the transmission of the breaking signal BRK), starting up the stopped pulse wave modulation device 10, controlling the pulse wave modulation device 10 to change the pulse wave modulation signal, outputting a wake-up signal WAK to wake up the circuit system 1, controlling the pulse detector 111 to change the detection configuration, changing the cumulative occurrences number of the specific pattern of the event discrimination module 112, outputting a control signal or a first data signal to a peripheral device PERP through a connected bus of the event response module 113 and/or requesting the peripheral device PERP to send a second data signal through the connected bus.

The event discrimination module 112 comprises a counter 1121 and a comparator 1122, and the counter 1121 is electrically connected to the comparator 1122. The counter 1121 is configured to update the cumulative occurrence number of the specific pattern according to the count of the detection result signal, and the comparator 1122 is configured to compare the cumulative occurrence number of the specific pattern and the comparison reference value, and generate specific event signal according to the comparison of the cumulative occurrence number of the specific pattern and the comparison reference value.

The event response module 113 comprises an event responder 1131 and a numeric modifier 1132, and the event responder 1131 is electrically connected to the numeric modifier 1132. The event responder 1131 is configured to receive the specific event signal, and according to the specific event signal, generate a numerical control signal, stop the pulse wave modulation device 10, start up the stopped pulse wave modulation device 10, output a wake-up signal WAK to wake up the circuit system 1, control the pulse detector 111 to change the detection configuration, change the cumulative occurrences number of the specific pattern of the event discrimination module 112, output a control signal or a first data signal to a peripheral device PERP through a connected bus of the event response module 113 and/or request the peripheral device PERP to send a second data signal through the connected bus. The numeric modifier 1132 is configured to receive the numerical control signal and generate the value modification signal to the pulse wave modulation device 10, so as to change the count value of the counter 101 of the pulse wave modulation device 10 and/or the comparison reference value received by the comparator 102.

The event detection controller further comprises multiple registers 114-118, the registers 114-118 are respectively electrically connected to the pulse detector 111, the counter 1121 of the event discrimination module 112, the comparator 1122 of the event discrimination module 112, the event responder 1131 of the event response module 113 and the numeric modifier 1132 of the event response module 113. The registers 114-118 are respectively used to temporary store the initial value of the detection configuration, the initial value of the cumulative occurrence number of the specific pattern, the initial value of the comparison reference value of the comparator 1122, the initial value of the specific event pattern and the initial value of the value modification signal.

Figure 2A:
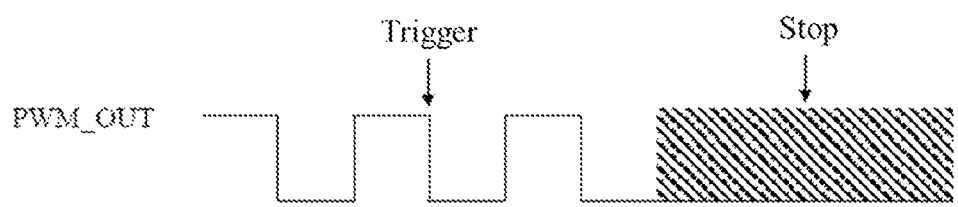
FIG. 2A is a waveform diagram of an event detection controller for a circuit system controlled by a pulse wave modulation signal performs a specific event handling according to an embodiment of the present disclosure.

Refer to FIG. 1 and FIG. 2A, and FIG. 2A is a waveform diagram of an event detection controller for a circuit system controlled by a pulse wave modulation signal performs a specific event handling according to an embodiment of the present disclosure. In this embodiment, the specific pattern of the detection configuration is set to be the falling edge, the comparison reference value of the comparator 1122 is set to be 1, the specific event handling is set to stop the pulse wave modulation device 10 (via the transmission of the breaking signal BRK), and the detected pulse wave modulation signal is the output pulse wave modulation signal PWM_OUT. In FIG. 2A, after the falling edge of the output pulse wave modulation signal PWM_OUT is detected twice, the execution of the specific event handling will be triggered by the event response module 113. Then, after the falling edge of the pulse wave modulation signal PWM_OUT is detected again (i.e. the falling edge of the pulse wave modulation signal PWM_OUT is detected three times), the pulse wave modulation device 10 will be stopped. Thus, the output pulse wave modulation signal PWM_OUT will be constant logic low level afterwards.

In short, in an embodiment of the execution of the internal control to achieve the safety requirements, the specific pattern of the detection configuration is the falling edge, and if the cumulative occurrence number of the specific pattern of the falling edge of the pulse wave modulation signal being detected is over the comparison reference value of the comparator 1122, the event response module 113 will stop the pulse wave modulation device 10.

Figure 2B:
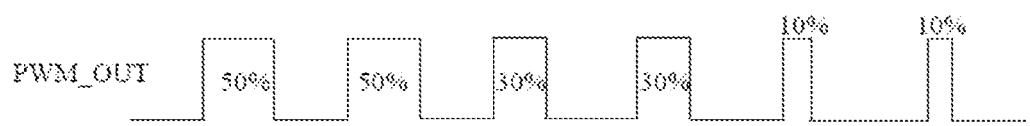
FIG. 2B is a waveform diagram of an event detection controller for a circuit system controlled by a pulse wave modulation signal performs another specific event handling according to an embodiment of the present disclosure.

Refer to FIG. 1 and FIG. 2B, and FIG. 2B is a waveform diagram of an event detection controller for a circuit system controlled by a pulse wave modulation signal performs another specific event handling according to an embodiment of the present disclosure. In this embodiment, the specific pattern of the detection configuration is set to be the duty cycle being 50%, the comparison reference value of the comparator 1122 is set to be 1, the specific event handling is set to change the specific pattern of the detection configuration to the duty cycle being 30%, control the pulse wave modulation device 10 to change the duty cycle of the output pulse wave modulation signal PWM_OUT to be 30%, and change the cumulative occurrence number of the specific pattern to be 0. Also, the detected pulse wave modulation signal is the output pulse wave modulation signal PWM_OUT. If the duty cycle of the output pulse wave modulation signal PWM_OUT being 50% is detected twice, the specific pattern of the detection configuration is set to the duty cycle being 30%, change the cumulative occurrence number of the specific pattern to be 0, control the pulse wave modulation device 10 to change the duty cycle of the output pulse wave modulation signal PWM_OUT to be 30%, and set the specific event handling to change the specific pattern of the detection configuration to the duty cycle being 10%, change the cumulative occurrence number of the specific pattern to be 0 and control the pulse wave modulation device 10 to change the duty cycle of the output pulse wave modulation signal PWM_OUT to be 10%. If the duty cycle of the output pulse wave modulation signal PWM_OUT being 30% is detected twice, the specific pattern of the detection configuration is set to the duty cycle being 10%, change the cumulative occurrence number of the specific pattern to be 0, and control the pulse wave modulation device 10 to change the duty cycle of the output pulse wave modulation signal PWM_OUT to be 10%.

In short, in an embodiment of execution of the internal control to achieve the output of various waveforms, the specific pattern of the detection configuration is the first duty cycle. If the cumulative occurrence number of the specific pattern of the first duty cycle of the pulse wave modulation signal being detected is over the comparison reference value of the comparator 1122, the event response module 113 control the pulse detector 111 to change the specific pattern of the detection configuration to the second duty cycle, change the cumulative occurrence number of the specific pattern, and control the pulse wave modulation device 10 to change the pulse wave modulation signal.

Figure 2C:
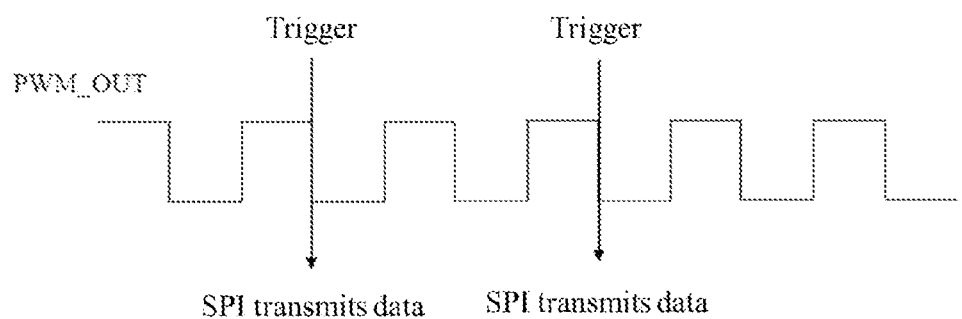
FIG. 2C is a waveform diagram of an event detection controller for a circuit system controlled by a pulse wave modulation signal performs another specific event handling according to an embodiment of the present disclosure.

Refer to FIG. 1 and FIG. 2C, and FIG. 2C is a waveform diagram of an event detection controller for a circuit system controlled by a pulse wave modulation signal performs another specific event handling according to an embodiment of the present disclosure. In this embodiment, the specific pattern of the detection configuration is set to be the falling edge, the comparison reference value of the comparator 1122 is set to be 1, the specific event handling is set to change the cumulative occurrence number of the specific pattern to be 0 and request the peripheral device PERP to transmit the second data signal, the detected pulse wave modulation signal is the output pulse wave modulation signal and the bus can be a serial peripheral interface (SPI). In FIG. 2C, if the falling edge of the output pulse wave modulation signal is detected twice, the event response module 133 will be triggered to perform the specific handling i.e. changing the cumulative occurrence number of the specific pattern to be 0 and requesting the peripheral device PERP to transmit the second data signal.

In brief, in an embodiment of the control of the external peripheral device to achieve the low power consumption, the specific pattern of the detection configuration is a falling edge, and if the cumulative occurrence number of the specific pattern of the falling edge of the pulse wave modulation signal being detected is over the comparison reference value of the comparator 1122, the event response module 113 changes the cumulative occurrence number of the specific pattern of the event discrimination module 112, and requests the peripheral device PERP to transmit the second data signal.

Figure 3:
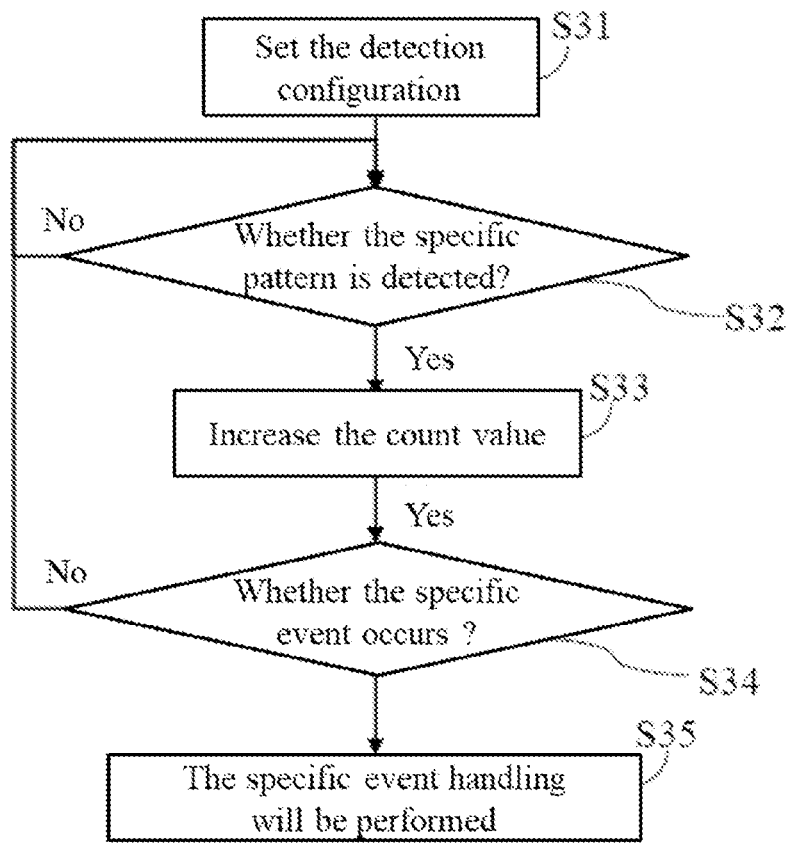
FIG. 3 is a flowchart of an event detection control method for a circuit system controlled by a pulse wave modulation signal according to an embodiment of the present disclosure.

Refer to FIG. 3, and FIG. 3 is a flowchart of an event detection control method for a circuit system controlled by a pulse wave modulation signal according to an embodiment of the present disclosure. First, in step S31, set the detection configuration. Then, in step S32, whether the pulse wave modulation signal from the pulse wave modulation device has the specific pattern corresponding to the set detection configuration is detected, and the detection result signal is generated, wherein the specific pattern includes the specific duty cycle, the specific edge and/or specific level. If the pulse wave modulation signal has the specific pattern corresponding to the set detection configuration is detected, then in step S33, the cumulative occurrence number of the specific pattern will be updated according to the detection result signal, wherein the cumulative occurrence number of the specific pattern is generally designed to increase the count value when the pulse wave modulation signal has the specific pattern corresponding to the set detection configuration is detected. If the pulse wave modulation signal does not have the specific pattern corresponding to the set detection configuration which is set, then step S34 will be executed.

In step S34, the specific event signal is generated according to the cumulative occurrence number of the specific pattern (for example, comparing the cumulative occurrence number of the specific pattern and the comparison reference value), so as to discriminate whether the specific event occurs. If the specific event does not occur, step S32 will be executed again. If the specific event occurs, in step S35, according to the specific event signal, the specific event handling defined by the specific event pattern related to the detection configuration will be performed, wherein the specific event handling includes stopping the pulse wave modulation device, starting up the stopped pulse wave modulation device, controlling the pulse wave modulation device to change the pulse wave modulation signal, outputting a wake-up signal to wake up the circuit system, changing the detection configuration, changing the cumulative occurrences number of the specific pattern, outputting a control signal or a first data signal to a peripheral device through a bus and/or requesting the peripheral device to send a second data signal through the bus.

In summary, the event detection control device and method can detect the specific event for the circuit system, and can perform the internal and external synchronizing control to achieve safety requirements if detecting the specific event, perform the internal control to achieve various waveform output, and/or perform the external control to connect with the external peripheral device to achieve the low power consumption requirements of the system. Furthermore, if the circuit system is operated in the low power consumption, the pulse wave modulation device and the peripheral device can be controlled directly without further awakening the sleeping processing unit.

All examples and embodiments in the present disclosure are only used to state the purpose. The modifications or changes based on the present disclosure will be suggested to those skilled in the art, and are be included in the essence, the scope, and the scope of the appended claims in the present disclosure.

What is claimed is:

1. An event detection controller for a circuit system controlled by a pulse wave modulation signal, comprising:

a pulse detector, configured to receive a detection configuration which has been set and the pulse wave modulation signal from a pulse wave modulation device to detect whether the pulse wave modulation signal has a specific pattern corresponding to the detection configuration and generate a detection result signal, wherein the specific pattern comprises a specific duty cycle, a specific edge and/or a specific level;

an event discrimination module electrically connected to the pulse detector, configured to receive the detection result signal and update a cumulative occurrence number of the specific pattern according to the detection result signal, and configured to generate a specific event signal according to the cumulative occurrence number of the specific pattern; and an event response module electrically connected to the event discrimination module, configured to receive the specific event signal and a specific event pattern corresponding to the detection configuration and perform a specific event handling which is defined corresponding to the specific event pattern according to the specific event signal, wherein the specific event handling comprises stopping the pulse wave modulation device, starting up the stopped pulse wave modulation device, controlling the pulse wave modulation device to change the pulse wave modulation signal, outputting a wake-up signal to wake up the circuit system, controlling the pulse detector to change the detection configuration, changing the cumulative occurrences number of the specific pattern of the event discrimination module, outputting a control signal or a first data signal to a peripheral device through a bus connected to the event response module and/or requesting the peripheral device to send a second data signal through the bus.

2. The event detection controller of claim 1, wherein the event discrimination module comprises a counter and a comparator, the counter is electrically connected to the comparator, the counter counts according to the detection result signal, so as to update the cumulative occurrences number of the specific pattern, and the comparator compare the cumulative occurrences number of the specific pattern with a comparison reference value and generates the specific event signal accordingly.

3. The event detection controller of claim 1, wherein the event response module comprises an event responder and a numeric modifier, the event responder is electrically connected to the numeric modifier, the event responder receives the specific event signal, and according to the specific event signal, the event responder generates a numerical control signal, stops the pulse wave modulation device, starts up the stopped pulse wave modulation device, outputs the wake-up signal to wake up the circuit system, controls the pulse detector to change the detection configuration, changes the cumulative occurrences number of the specific pattern of the event discrimination module, outputs the control signal or the first data signal to the peripheral device through the bus and/or requesting the peripheral device to send the second data signal through the bus, and the numeric modifier receives the numerical control signal and generates a value modification signal to the pulse wave modulation device to change a count value of a counter and/or a comparison reference value received by a comparator.

4. The event detection controller of claim 1, further comprising a plurality of registers respectively electrically connected to the pulse detector, a counter and a comparator of the event discrimination module and an event responder and a numeric modifier of the event response module, and the registers are configured to respectively temporary store an initial value of the detection configuration, an initial value of the cumulative occurrences number of the specific pattern, an initial value of the comparison reference value, an initial value of the specific event pattern and an initial value of the value modification signal.

5. The event detection controller of claim 1, wherein the specific pattern of the detection configuration is a falling edge, and when detecting the cumulative occurrences number of the specific pattern of the falling edge of the pulse wave modulation signal is larger than a comparison reference value, the event response module stops the pulse wave modulation device.

6. The event detection controller of claim 1, wherein the specific pattern of the detection configuration is a first duty cycle, and when detecting the cumulative occurrences number of the specific pattern of the first duty cycle of the pulse wave modulation signal is larger than a comparison reference value, the event response module controls the pulse detector to change the specific pattern of the detection configuration to a second duty cycle, changes the cumulative occurrences number of the specific pattern of the event discrimination module, and controls the pulse wave modulation device to change the pulse wave modulation signal.

7. The event detection controller of claim 1, wherein the specific pattern of the detection configuration is a falling edge, and when detecting the cumulative occurrences number of the specific pattern of the falling edge of the pulse wave modulation signal is higher than a comparison reference value, the event response module changes the cumulative occurrences number of the specific pattern of the event discrimination module and requests the peripheral device to send a second data signal.

8. A circuit system, comprising:
an event detection controller for a circuit system controlled by a pulse wave modulation signal, comprising:
a pulse detector, configured to receive a detection configuration which has been set and the pulse wave modulation signal from a pulse wave modulation device to detect whether the pulse wave modulation signal has a specific pattern corresponding to the detection configuration and generate a detection result signal, wherein the specific pattern comprises a specific duty cycle, a specific edge and/or a specific level;

an event discrimination module electrically connected to the pulse detector, configured to receive the detection result signal and update a cumulative occurrence number of the specific pattern according to the detection result signal, and configured to generate a specific event signal according to the cumulative occurrence number of the specific pattern; and an event response module electrically connected to the event discrimination module, configured to receive the specific event signal and a specific event pattern corresponding to the detection configuration and perform a specific event handling which is defined corresponding to the specific event pattern according to the specific event signal, wherein the specific event handling comprises stopping the pulse wave modulation device, starting up the stopped pulse wave modulation device, controlling the pulse wave modulation device to change the pulse wave modulation signal, outputting a wake-up signal to wake up the circuit system, controlling the pulse detector to change the detection configuration, changing the cumulative occurrences number of the specific pattern of the event discrimination module, outputting a control signal or a first data signal to a peripheral device through a bus connected to the event response module and/or requesting the peripheral device to send a second data signal through the bus;

the pulse wave modulation device; and a load circuit electrically connected to the pulse wave modulation device and controlled by the pulse wave modulation signal.

9. The circuit system of claim 8, comprising:

an event discrimination module comprises a counter and a comparator, the counter is electrically connected to the comparator, the counter counts according to a detection result signal, so as to update a cumulative occurrences number of a specific pattern, and the comparator compare the cumulative occurrences number of the specific pattern with a comparison reference value and generates a specific event signal accordingly;

the pulse wave modulation device; and a load circuit electrically connected to the pulse wave modulation device and controlled by the pulse wave modulation signal.

10. The circuit system of claim 8, comprising:

an event response module comprises an event responder and a numeric modifier, the event responder is electrically connected to the numeric modifier, the event responder receives a specific event signal, and according to the specific event signal, the event responder generates a numerical control signal, stops a pulse wave modulation device, starts up the stopped pulse wave modulation device, outputs a wake-up signal to wake up the circuit system, controls a pulse detector to change a detection configuration, changes a cumulative occurrences number of a specific pattern of an event discrimination module, outputs a control signal or a first data signal to a peripheral device through the bus and/or requesting the peripheral device to send a second data signal through the bus, and the numeric modifier receives the numerical control signal and generates a value modification signal to the pulse wave modulation device to change a count value of a counter and/or a comparison reference value received by a comparator;

the pulse wave modulation device; and a load circuit electrically connected to the pulse wave modulation device and controlled by the pulse wave modulation signal.

11. The circuit system of claim 8, comprising:

a plurality of registers, respectively electrically connected to the pulse detector, a counter and a comparator of an event discrimination module and an event responder and a numeric modifier of an event response module, and the registers are configured to respectively temporary store an initial value of a detection configuration, an initial value of a cumulative occurrences number of the specific pattern, an initial value of a comparison reference value, an initial value of a specific event pattern and an initial value of a value modification signal;

the pulse wave modulation device; and a load circuit electrically connected to the pulse wave modulation device and controlled by the pulse wave modulation signal.

12. The circuit system of claim 8, comprising:

a specific pattern of the detection configuration is a falling edge, and when detecting a cumulative occurrences number of the specific pattern of the falling edge of a pulse wave modulation signal is larger than a comparison reference value, an event response module stops a pulse wave modulation device;

the pulse wave modulation device; and a load circuit electrically connected to the pulse wave modulation device and controlled by the pulse wave modulation signal.

13. The circuit system of claim 8, comprising:

a specific pattern of the detection configuration is a first duty cycle, and when detecting a cumulative occurrences number of a specific pattern of the first duty cycle of the pulse wave modulation signal is larger than a comparison reference value, an event response module controls a pulse detector to change the specific pattern of a detection configuration to a second duty cycle, changes the cumulative occurrences number of the specific pattern of an event discrimination module, and controls a pulse wave modulation device to change the pulse wave modulation signal;

the pulse wave modulation device; and a load circuit electrically connected to the pulse wave modulation device and controlled by the pulse wave modulation signal.

14. The circuit system of claim 8, comprising:

a specific pattern of a detection configuration is a falling edge, and when detecting a cumulative occurrences number of the specific pattern of the falling edge of a pulse wave modulation signal is higher than a comparison reference value, an event response module changes the cumulative occurrences number of the specific pattern of an event discrimination module and requests a peripheral device to send a second data signal;

the pulse wave modulation device; and a load circuit electrically connected to the pulse wave modulation device and controlled by the pulse wave modulation signal.

15. The circuit system of claim 8, wherein the pulse wave modulation device is a pulse width modulation device, and the pulse wave modulation signal is a pulse width modulation signal.

16. An event detection control method for a circuit system controlled by a pulse wave modulation signal, comprising:

detecting whether the pulse wave modulation signal from a pulse wave modulation device has a specific pattern corresponding to a detection pattern which has been set and generating a detection result signal, wherein the specific pattern comprises a specific duty cycle, a specific edge or/and a specific level;

updating a cumulative occurrences number of the specific pattern according to the detection result signal;

generating a specific event signal according to the cumulative occurrences number of the specific pattern; and performing a specific event handling which is defined by a specific event pattern corresponding to the detection configuration according to the specific event signal, wherein the specific event handling comprises stopping a pulse wave modulation device, starting up the stopped pulse wave modulation device, controlling the pulse wave modulation device to change the pulse wave modulation signal, outputting a wake-up signal to wake up the circuit system, changing the detection configuration, changing a cumulative occurrences number of the specific pattern, outputting a control signal or a first data signal to a peripheral device through a bus and/or requesting the peripheral device to send a second data signal through the bus.

* * * * *